Patented May 23, 1944

2,349,278

UNITED STATES PATENT OFFICE 2,349,278

PREPARATION OF TOCOPHEROL-CONTAINING MATERIALS AND PRODUCTS

Kenneth C. D. Hickman, Rochester, N. Y., assignor to Distillation Products, Inc., Rochester, N. Y., a corporation of Delaware No Drawing. Application June 10, 1942, Serial No. 446,524

2 Claims. (Cl. 260—398.5)

This application relates to improved procedure for the fortification of materials with tocopherol and in particular improved procedure for incorporation of tocopherol in edible substances.

Tocopherols are widely used for their antioxidant and vitamin E activity. They are of particular value in foods since they exert their antioxidant and vitamin E activity therein. Heretofore it has been necessary to first concentrate the tocopherol contained in natural source materials before being utilized in this manner. The preparation of concentrates involves procedure which greatly adds to the cost of the final product. Also the concentration procedure requires specialized apparatus which is not readily available at the present time.

This invention has for its object to provide improved procedure for the preparation of dilute tocopherol concentrates which can be cheaply produced with existing refinery or chemical plant equipment. Another object is to provide relatively dilute tocopherol or vitamin E concentrates which are satisfactory as sources of vitamin E or antioxidant and which are suitable for the fortification or preservation of foods. Another object of the invention is to provide simple and relatively cheap procedure for the preparation of vitamin E concentrates. Other objects will appear hereinafter.

These and other objects are accomplished by my invention which includes adding scum to a vegetable or animal oil or like material (i. e. a fat) said scum being produced during the vacuum-carrier gas deodorization treatment of a tocopherol-containing fat, and subjecting this mixture to a relatively mild deodorization treatment to remove a substantial part of the free fatty acids and odoriferous materials contained in the mixture. The product thus produced is then alkali refined and may be bleached, if desired. There is thus obtained a product having a very low cost, good palatability, and a sufficient content of tocopherol or vitamin E that it may be used as a partial concentrate or added to foods to increase their vitamin E content and for resistance to oxidation.

In the following description I have given several of the preferred embodiments of my invention but it is to be understood that these are set forth for the purpose of illustration and not in limitation thereof.

The scum which is utilized in my invention is a substance which has heretofore been a waste by-product of the vegetable and animal oil i. e. fat industry and particularly the vegetable and animal oil deodorization industry. This material is a complex mixture of organic compounds volatilized from the oil during deodorization and like procedures. The most common method of deodorizing vegetable and animal oils is to pass steam therethrough under reduced pressure. The steam after passing through the oil is usually condensed in a barometric condenser and the condensed steam is then permitted to flow into a sump, catch basin, or condenser discharge. The scum separates on the surface of the water in the sump or condenser and may be skimmed off. It has heretofore been the usual practice to permit it to flow into the sewer. The scum also collects on the walls of the apparatus and may be removed therefrom. Such materials are known in the deodorization art as "deodorizer hotwell sludge," "catch basing scum," "catch-all sludge," etc. It is also somewhat common procedure in the deodorizing field to place a trap between the deodorizer and the condenser, in which case the scum or its substantial equivalent is partially or completely condensed in the trap instead of entirely passing into the barometric catch basin or sump. Such material is known in the deodorizing art as "trap sludge." It is to be understood that the word scum as used herein and in the claims shall include all such matters in crude or substantially crude condition produced by the methods mentioned or by an equivalent method involving the separation of the organic material volatilized during the carrier gas, vacuum treatment of vegetable and animal oils which contain tocopherol.

Useful scum can only be obtained from the foregoing procedures when applied to oils which contain tocopherol. Most of the vegetable and animal oils in their fresh and natural condition contain this material, but the vegetable oils are usually considerably richer sources and I prefer to utilize scum produced from them. Examples of particularly rich oils are corn, cottonseed and soybean. Fresh oils are preferred as a source of the scum and particularly oils which have been subjected to no treatment which would have a harmful effect upon the tocopherol. Ordinarily alkali refining decreases the tocopherol content, but oils which have been alkali refined can serve as a useful source, although a poorer one than the crude oils.

The scum as ordinarily obtained has a relatively high content of water; i. e., about 5 to 20 percent. This water has no deleterious action since steam is usually introduced during the subsequent deodorization treatment. However, in some cases the removal of this water is desirable, particularly when the mixture of scum and glyceride or fat is subjected to a deodorization treatment under vacuum without inert gas. However, even when such a method of deodorization is used, the removal of water is not essential. The water can be removed by merely heating the scum until a layer of oil separates. The oil layer is decanted or otherwise removed and the water layer is discarded.

The scum in wet or dried condition is dissolved in the fat or glyceride. The proportions of scum and glyceride can be varied widely, the determining question being the tocopherol or vitamin E content of the finished product. The scum usually contains about 1 to 6 per cent tocopherol and it should be incorporated in the glyceride or fat in such proportions as to give a mixture having the desired vitamin E content. The main purpose of diluting the scum with a glyceride or fat is to put it in a better condition for deodorization treatment. However, the crude scum undiluted with fat can be deodorized and its dilution for this purpose is not absolutely necessary. When the final product is to be used for the fortification of other materials it is usually necessary to incorporate a greater proportion of scum than when the mixture itself is to be used as a vitamin E product. Proportions depend upon the desired potency of the finished product. Amounts of between about 10 and 50 per cent scum to fat or glyceride are preferred, and especially proportions of about 20 to 30 per cent scum. Smaller or larger amounts may be used.

This mixture of scum and glyceride or fat is then subjected to a relatively mild deodorization treatment so as to remove most of the impurities contained in the scum without volatilizing the tocopherol contained therein. The most satisfactory method of deodorization involves treatment of the mixture with steam under vacuum conditions. This type of deodorization treatment is well known in the deodorizing art and reference is made to Patents 1,713,431, 1,746,078, 1,982,598, 1,996,852, 2,078,841, 2,124,707 and 2,136,029 for typical deodorization procedures. This deodorization usually involves heating the material to a temperature of about 150–250° C. and preferably about 200° C. and passing steam therethrough which has a temperature about the same as or higher than that of the material being deodorized. The procedure is carried out under vacuum and in the more recent, improved deodorizing processes the pressure is usually about 3 to 12 mm. Treatment requires several hours with batch processes but continuous methods result in deodorization in a shorter time. The mixture may be deodorized by subjecting it to high vacuum without any carrier gas of any kind, as described in my Patent 2,249,524. Also the steam deodorization procedure may be modified by utilizing inert carrier gas other than steam such as nitrogen. Regardless of the procedure employed for the deodorization it should be terminated before much of the tocopherol is removed. I have found that the tocopherol has a somewhat lower vapor pressure than the free fatty acids and odoriferous materials in the scum and that the undesirable more volatile materials can be removed by the deodorization treatment without substantial removal of the tocopherol.

The product thus produced can be utilized as such, but it may be desirable to subject it to an alkali refining treatment to further improve the properties of the material. Alkali refining of oils is well known procedure in the glyceride oil art. Any conventional alkali refining method is satisfactory. One such procedure involves adding a somewhat dilute caustic alkali to the fat in liquid condition, stirring at a slightly elevated temperature, such as about 50° to 60° C. and then permitting the soap stock to settle. The supernatant refined oil is decanted or siphoned off. Exposure to air should be avoided as much as possible during this treatment. This procedure results in a product which has characteristics as desirable as the best concentrates heretofore prepared and which is eminently suitable for incorporation in high quality foods as a source of vitamin E.

In some cases the color of the product may be dark or otherwise not exactly as desired and this can be taken care of by filtering the mixture through an activated earth, activated carbon or equivalent decolorizing agent.

*Example 1*

Eighty parts of butter fat are mixed with 20 parts of refinery scum containing approximately 3 per cent of tocopherol. The mixture is placed in a steam deodorizer and deodorized at 5 mm. for 4 hours at 200° C. until the acid value is substantially lowered. The mixture is then cooled and transferred to a refining kettle where 2 parts of caustic soda, 20% solution, are stirred in. After settling, the clear supernatant fat is filtered through a mixture of 3 parts of activated clay and 1 part of activated carbon. The final product contains ½% of mixed tocopherols. It is suitable for adding to butter or margarine in the proportion of 1 part to 10–250 parts of butter.

*Example 2*

Eighty parts of scum containing 2% of mixed tocopherols are mixed with 20 parts of prime lard and the mixture is placed in a steam deodorizer and deodorized at about 5 mm. for four hours at 200° C. The product is then cooled, transferred to a refining kettle where two parts of caustic soda in the form of a 20% solution are stirred in. The soap stock is permitted to settle and the clear, supernatant fat is withdrawn and filtered as described above. The finished product is then added to margarine to provide a product containing about .02% mixed tocopherol. Ten thousand units of vitamin A per pound of margarine were also incorporated. The tocopherol substantially preserves the vitamin A and at the same time acts as a useful form of vitamin E in the human diet.

What I claim is:

1. The process of preparing a stabilized fat containing tocopherol which comprises adding to the fat, scum which contains tocopherol and which is produced during the vacuum-carrier gas deodorization treatment of a fat which contains tocopherol, subjecting this mixture to a mild vacuum-deodorization treatment whereby most of the free fatty acids and odors but little of the tocopherol contained in the scum are removed, and then subjecting the deodorized mixture to an alkali-refining treatment.

2. The process of preparing a stabilized fat containing tocopherol which comprises adding to the fat, scum which contains tocopherol and which is produced during the vacuum-carrier gas deodorization treatment of a vegetable or animal fat which contains tocopherol, subjecting this mixture to a vacuum deodorization treatment at a temperature between about 150° and 250° C. and at a pressure of less than about 12 mm. whereby most all of the odoriferous materials and free fatty acids contained in the scum are removed but substantially the original tocopherol content of the scum remains in the mixture, subjecting the deodorized mixture to an alkali-refining treatment and then treating the deodorized and alkali-refined mixture with a decolorizing agent.

KENNETH C. D. HICKMAN.